Nov. 10, 1931.  L. DUNKELSBERG  1,831,347
SPECTACLE HINGE CONSTRUCTION
Filed Feb. 26, 1927
Fig. 1.
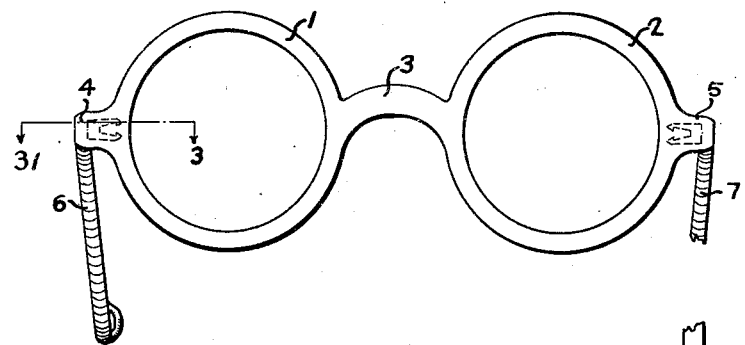
Fig. 2
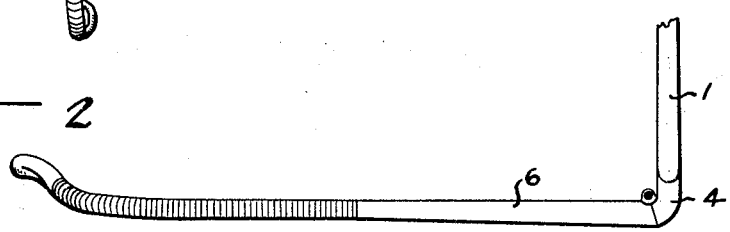
Fig. 4  Fig. 5  Fig. 3
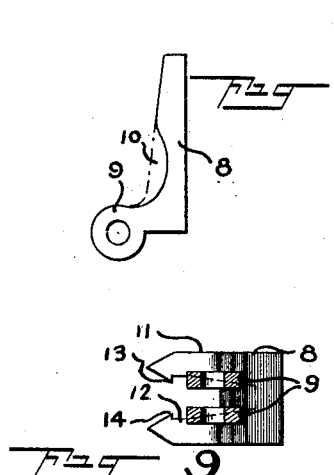 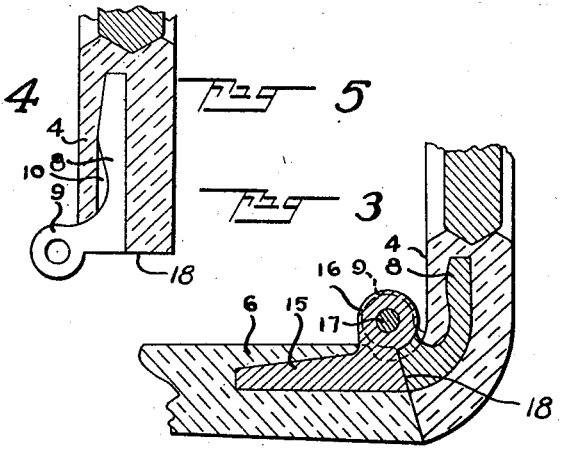
Fig. 9
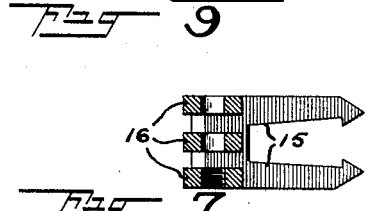 Fig. 6 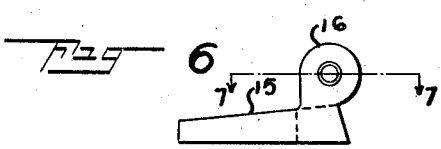
Fig. 7
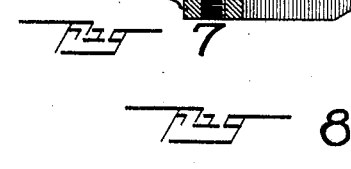
Fig. 8
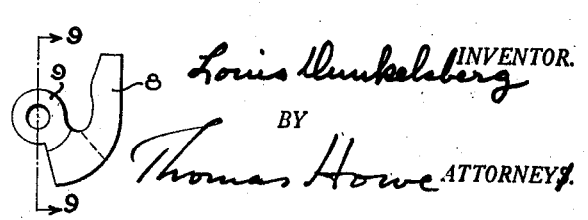
Louis Dunkelsberg INVENTOR.
BY Thomas Howe ATTORNEYS.

Patented Nov. 10, 1931                                              1,831,347

UNITED STATES PATENT OFFICE

LOUIS DUNKELSBERG, OF NEW YORK, N. Y.

SPECTACLE HINGE CONSTRUCTION

Application filed February 26, 1927. Serial No. 171,149.

This invention relates to the hinge arrangements whereby a temple is hingedly secured to the fronts of spectacles.

The main object of the invention is to provide a construction in relation to spectacle hinges whereby the front width of the spectacles is reduced and a firm hinge connection is secured. This is accomplished by causing the end pieces to have their outer ends bent backwardly and inwardly, the hinge parts (i. e. the shanks or plates) having weakened sections whereby they may be readily and properly bent to conform to the curvature or bending of the end pieces.

The invention has special application to spectacle frames of zylonite, celluloid or similar material, and metal hinges. The best conformity and cooperation of the bent hinge part and end piece is to bend them together into the desired form. When, however, this is attempted with hinges having the usual shank or plate portion, and this is especially the case where the end piece of celluloid is heated to make it more pliable, the hinge shank will become displaced in, and may even emerge from the material of the end piece. By providing a weakened section at a desired point of the hinge plate or shank, the shank will bend easily with the end piece and the bent structure comprising the end piece and hinge part will be of the desired contour and the parts mentioned will be retained in their desired relationship. If the weakened section is tapered the bending may be graduated so that the desired shape and location of bend may be secured.

A further object of the invention is to provide broad abutting faces between the parts hinged together so that a firm and strong relationship between these parts is produced.

A further object of the invention is to provide an improved method of forming a curved or bent end piece and hinge plate or shank.

Other and ancillary objects of the invention will appear hereinafter.

In the accompanying drawings, which illustrate the invention—

Fig. 1 is a front view of spectacles embodying the invention;

Fig. 2 is a top plan view of the spectacles of Fig. 1, partly broken away, showing the relationship (which is the same as to each temple) of the temple, hinge, end piece and lens rim;

Fig. 3 is a section on an enlarged scale on the line 3—3 of Fig. 1, the spectacles being partly broken away;

Fig. 4 is a top plan view, on an enlarged scale, of a hinge part adapted to be applied to the end piece of a frame;

Fig. 5 is a horizontal section, on the same scale as Fig. 3, through an end piece showing the maner of applying the hinge part to the end piece in the first instance;

Fig. 6 is a top plan view, on the same scale as Figs. 3 to 5, of a hinge part adapted for securing to a temple;

Fig. 7 is a section on the line 7—7 of Fig. 6;

Fig. 8 is a top plan view of the bent hinge part as shown in the end piece of Fig. 3; and Fig. 9 is a section on the line 9—9 of Fig. 8.

Referring to the drawings the spectacles comprise fronts including the lens rims 1 and 2 secured together by the bridge or nose-piece 3 and having end pieces 4 and 5 projecting from the outer sides. All the parts thus far referred to may be of celluloid or zylonite. Temples 6 and 7, of celluloid or zylonite are secured to the end pieces respectively in an articulated manner by metal hinges as will be hereinafter referred to in detail.

The metal hinge part comprising the shank 8 and barrel 9, with the shank unbent as shown in Fig. 4, is inserted in the end piece 4 so as to be embedded therein as shown in Fig. 5. This may be done by forming a recess in the end piece for the shank or by forcing the shank into the heat softened zylonite or celluloid. At this stage the end piece 4 is substantially straight and in the plane of the rims. The end piece with its embedded hinge shank has its outer end bent backwardly and inwardly, preferably while the zylonite is heated to render it sufficiently pliable, to a position as shown in Fig. 3. The concave recess 10 formed upon the rear side of the hinge shank forms a weakened section which permits the shank to bend readily with the zylonite so that the composite structure has the desired location and form of bend and the shank and material of the end piece do not become displaced in the bending operation, from their desired relationship. It will be seen that the sloping sides of the recess 10 produce a tapering of the weakened section which gives the desired graduation and location of the bend.

The end piece and hinge part having been bent as described, they will occupy the position with relation to the rims as shown in Fig. 3 from which it will be observed that the front width of the spectacles is much reduced and a more pleasing appearance attained. It will be noted (see Fig. 3) that in the bending operation the zylonite will be forced into the recess 10 so as to become interlocked with and more securely and firmly hold the hinge part to the frame. In this bent position the hinge part will be in the shape as shown in Figs. 8 and 9 from which it will be observed that the end of the shank is bifurcated into the limbs 11 and 12, pointed at their ends whereby the entry of the shank into the zylonite is facilitated, and that the limbs have barbs 13 and 14 which interlock with the zylonite to aid in securing the hinge to the end piece.

The zylonite temple 6 carries a hinge part, as shown in Figs. 6 and 7, comprising the shank 15 and barrel 16, this part being in all respects like the hinge part secured to the end piece of the front before it has been bent (see Figs. 4 and 5) and except it has no recess. The shank 15 is inserted and embedded in the temple (see Fig. 3). The barrels of the two hinge parts are fitted into each other in the usual way and the hinge pin 17 inserted.

It will be observed that the barrel 9 of the hinge part which is attached to the end piece 4 projects laterally from the end piece when the parts are in bent positions (see Fig. 3) rather than from the rear face 18.

While the invention has been illustrated in what is considered its best application it may have other embodiments without departing from the spirit of the invention and is not limited to the structures shown in the drawings.

What I claim is:

1. The method of assembling a hinge portion with a lens frame having an end piece which consists in applying a hinge portion with a weakened section to said end piece and then bending the said end piece and hinge portion about the weakened section together to the desired form.

2. The method of assembling a metal hinge portion with a celluloid lens frame having an end piece which consists in embedding a part having a weakened section of the hinge portion in said end piece, and then bending the end piece and hinge portion together about said weakened section, to the desired form.

3. In an ophthalmic mounting the combination with a lens rim, of an end piece projecting therefrom, a hinge portion comprising a barrel and means for securing said barrel to said end piece, said securing means having a weakened section adjacent said barrel, said end piece being curved and said securing means being also curved about said weakened section in conformity to the curvature of said end piece.

4. In an ophthalmic mounting the combination with a lens rim, of an end piece projecting therefrom, a hinge portion comprising a barrel and means for securing said barrel to said end piece, said securing means having a tapering weakened section adjacent said barrel, said end piece being curved and said securing means being curved about said weakened section in conformity to the curvature of said end piece.

5. In an ophthalmic mounting the combination with a lens rim, of an end piece projecting therefrom, a hinge portion comprising a barrel and a bifurcated shank secured to said barrel, said shank having a weakened section between the bifurcation and the barrel, said end piece being curved and said shank being also curved about said weakened section in conformity to said end piece.

6. In an ophthalmic mounting the combination with a celluloid lens rim having an end piece projecting therefrom, of a metal hinge portion comprising a barrel and a shank having a weakened section adjacent the barrel, said end piece being curved and said shank being also curved about said weakened section in conformity to the curvature of said end piece, a celluloid temple and a second metal hinge portion cooperating with the aforesaid hinge portion and secured to said temple.

In testimony whereof I have signed this specification this 25th day of October, 1926.

LOUIS DUNKELSBERG.